United States Patent
Reed et al.

(10) Patent No.: US 11,269,454 B2
(45) Date of Patent: Mar. 8, 2022

(54) SUPPRESSION OF STRUCTURED IMAGE ARTIFACTS

(71) Applicant: Apple Inc., Cupertino, CA (US)

(72) Inventors: Judd E. Reed, Santa Rosa, CA (US); Ari Y. Benbasat, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/177,977

(22) Filed: Feb. 17, 2021

(65) Prior Publication Data

US 2021/0191563 A1 Jun. 24, 2021

Related U.S. Application Data

(63) Continuation of application No. 16/107,037, filed on Aug. 21, 2018, now Pat. No. 10,928,955.

(60) Provisional application No. 62/557,122, filed on Sep. 11, 2017.

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01); *G06F 2203/04104* (2013.01)

(58) Field of Classification Search
CPC .. G06F 3/0418; G06F 3/0412; G06F 3/04182; G06F 3/04166; G06F 3/0446; G06F 3/0488; G06F 3/041; G06F 3/044; G06F 3/04186; G06F 3/0443; G06F 3/03547; G06F 3/661; G06F 2230/04182; G06F 2230/04808; G06F 2230/04106
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Final Office Action received for U.S. Appl. No. 16/107,037, dated Jan. 13, 2020, 17 pages.

(Continued)

*Primary Examiner* — Dong Hui Liang
(74) *Attorney, Agent, or Firm* — Kubota & Basol LLP

(57) ABSTRACT

Structured noise from various aggressors can be suppressed to improve touch performance. A respective noise characteristic can be determined for each respective group of touch nodes (e.g., row, column) among multiple groups of touch nodes in a masked touch image. The respective noise characteristic can be removed from the corresponding respective group of touch nodes in the touch image. For example, a respective noise characteristic can be determined for each respective row and/or for each respective column in the masked touch image. The respective noise characteristic can be removed from the respective row and/or column in the unmasked touch image. In some examples, the determining and subtracting of the noise characteristic can be repeated iteratively within a window of time and/or until one or more noise criteria are met.

20 Claims, 8 Drawing Sheets

(56) References Cited

U.S. PATENT DOCUMENTS

| | | |
|---|---|---|
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 9,904,412 B2 | 2/2018 | Stevenson et al. |
| 2006/0197753 A1 | 9/2006 | Hotelling |
| 2012/0194452 A1 | 8/2012 | Cho et al. |
| 2012/0249433 A1 | 10/2012 | Deng et al. |
| 2014/0062949 A1* | 3/2014 | Chang .................. G06F 3/0446 345/174 |
| 2014/0118297 A1* | 5/2014 | Huang .................. G06F 3/0236 345/174 |
| 2015/0242009 A1 | 8/2015 | Xiao et al. |
| 2016/0196003 A1 | 7/2016 | Yoon et al. |
| 2016/0291792 A1 | 10/2016 | Sawahata et al. |
| 2017/0090670 A1 | 3/2017 | Stevenson et al. |
| 2017/0139527 A1 | 5/2017 | Nathan et al. |
| 2018/0059852 A1 | 3/2018 | Sterling et al. |
| 2020/0142532 A1 | 5/2020 | Kravets et al. |

OTHER PUBLICATIONS

Non-Final Office Action received for U.S. Appl. No. 16/107,037, dated Jul. 30, 2019, 15 pages.

Non-Final Office Action received for U.S. Appl. No. 16/107,037, dated May 6, 2020, 20 pages.

Notice of Allowance received for U.S. Appl. No. 16/107,037, dated Oct. 22, 2020, 9 pages.

Lee et al., "A Multi-Touch Three Dimensional Touch-Sensitive Tablet", CHI'85 Proceedings, Apr. 1985, pp. 21-25.

Rubine, Dean, "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

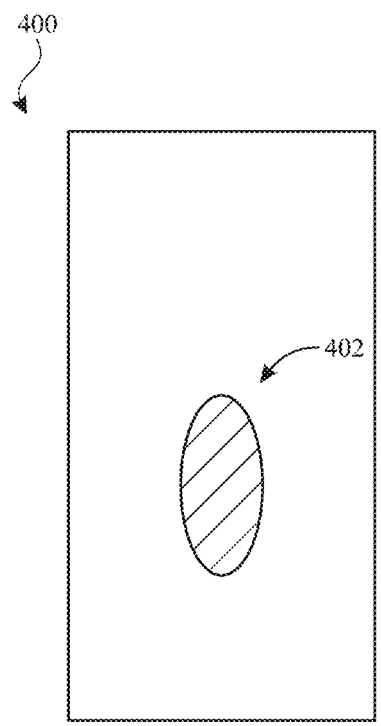
*FIG. 4A*
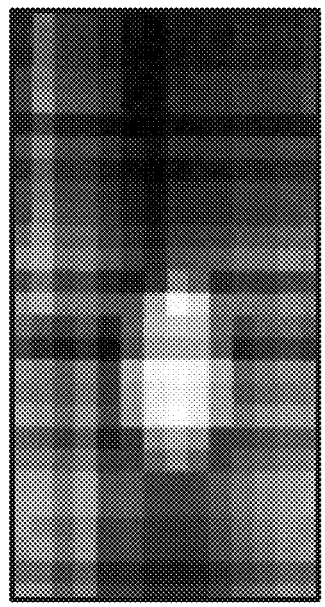 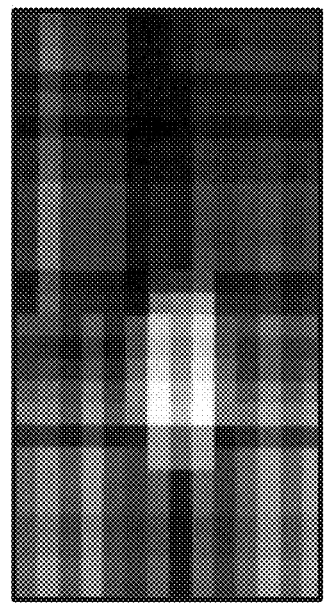
*FIG. 4B*          *FIG. 4C*

| 2 | 4 | 10 | 13 | 18 | 12 | 10 | 3 | 5 | 2 | 2 | 4 |
|---|---|---|---|---|---|---|---|---|---|---|---|
| 0 | 7 | 28 | 45 | 48 | 37 | 15 | 1 | 0 | 4 | 5 | 0 |
| 5 | 10 | 38 | 85 | 86 | 52 | 16 | 0 | 5 | 1 | 0 | 3 |
| 4 | 12 | 44 | 85 | 85 | 50 | 15 | 5 | 0 | 3 | 5 | 2 |
| 1 | 10 | 21 | 39 | 41 | 36 | 12 | 0 | 2 | 5 | 0 | 1 |
| 3 | 8 | 12 | 15 | 15 | 12 | 10 | 5 | 5 | 4 | 2 | 3 |
| 0 | 5 | 0 | 5 | 0 | 5 | 0 | 3 | 0 | 5 | 1 | 0 |
| 4 | 2 | 5 | 0 | 2 | 0 | 4 | 0 | 5 | 0 | 5 | 5 |
| 1 | 5 | 1 | 0 | 5 | 0 | 1 | 5 | 4 | 0 | 5 | 0 |
| 5 | 4 | 0 | 3 | 0 | 5 | 0 | 3 | 0 | 2 | 0 | 3 |
| 3 | 0 | 4 | 5 | 0 | 1 | 5 | 0 | 5 | 3 | 0 | 5 |
| 0 | 1 | 5 | 3 | 5 | 0 | 2 | 5 | 4 | 0 | 5 | 0 |

SUPPRESSION OF STRUCTURED IMAGE ARTIFACTS

CROSS-REFERENCE TO RELATED APPLICATION

This Application is a continuation of U.S. patent application Ser. No. 16/107,037, filed Aug. 21, 2018, which claims the benefit of U.S. Provisional Application No. 62/557,122, filed Sep. 11, 2017, the entire disclosures of which are herein incorporated by reference for all purposes.

FIELD OF THE DISCLOSURE

This relates generally to touch input processing for touch-sensitive devices, and more particularly, to suppressing structured noise in touch images.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the touch sensor panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch. Thereafter, the computing system can perform one or more actions based on the touch. In the case of some touch sensing systems, a physical touch on the display may not be needed to detect a touch. For example, in some capacitive-type touch sensing systems, fringing electrical fields used to detect touch can extend beyond the surface of the display, and objects approaching near the surface may be detected near the surface without actually touching the surface. Performance of touch sensing systems, however, can be degraded by noise including structured noise from various aggressors.

SUMMARY OF THE DISCLOSURE

This relates to systems and methods for suppressing structured noise. A respective noise characteristic can be determined for each respective group of touch nodes among multiple groups of touch nodes in a masked touch image. The respective noise characteristic can be removed from the corresponding respective group of touch nodes in the touch image. For example, a respective noise characteristic can be determined for each respective row and/or for each respective column in the masked touch image. The respective noise characteristic can be removed from the respective row and/or column in the unmasked touch image. In some examples, the noise characteristic can be determined by averaging background touch signals corresponding to touch nodes in a respective row or column of the masked touch image to determine a noise offset that can be subtracted from each touch signal corresponding to touch nodes in a respective row or column of the unmasked touch image. In some examples, the determining and subtracting of the noise characteristic can be repeated iteratively within a window of time and/or until one or more noise criteria are met.

BRIEF DESCRIPTION OF THE DRAWINGS

FIGS. 4A-4C illustrate an exemplary touch on a touch sensor panel and corresponding touch images at different times according to examples of the disclosure.

FIGS. 9A-9E illustrate exemplary images including an exemplary touch image and exemplary mask images according to examples of the disclosure.

DETAILED DESCRIPTION

Figure 1A:
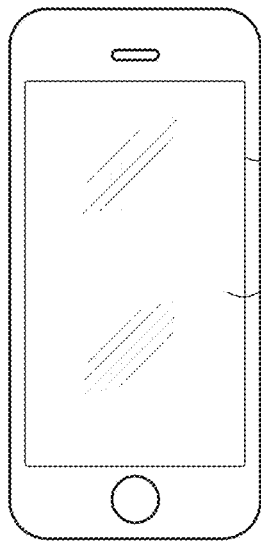
FIGS. 1A-1E illustrate exemplary systems with touch screens that can perform input processing according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to systems and methods for suppressing structured (or textured) noise. Structured or textured noise refers to image artifacts appearing in a structured manner in an image of touch for an array of touch nodes due to sensing errors from noise introduced at sensors measuring the touch nodes. For example, a touch screen or touch sensor panel may include an array of sensors arranged in orthogonal groups (e.g., rows and columns) that can share properties due to physical or operational interconnections, including susceptibility to noise. For example, touch nodes can be organized into rows and columns where touch node members of each row or column may be driven by a shared stimulation, sensed together, and/or share physical or logical traits. Noise introduced from various sources of noise (e.g., noise aggressors) can cause errors in the sensor output that can have similar or related properties among touch nodes in each respective group and give rise to structured (or textured) noise that can manifest as image artifacts in the touch image. The suppression of structured noise can leverage the shared properties of groups to correct these errors and remove image artifacts. For example, a respective noise characteristic can be determined for each respective group of touch nodes among multiple groups of touch nodes in a masked touch image. The masked touch image can mask off regions (or subsets of touch nodes) of the touch image which may correspond to touches or otherwise not meet criteria to be determined to be background noise ("non-background" nodes). By masking the touch image, the respective noise characteristic for each group of touch nodes can be determined for un-masked nodes meeting the criteria to be determined to be background ("background" nodes). The masked off "non-background" nodes (e.g., including touch nodes at which touch is detected) can be excluded. The respective noise characteristic can be removed from the corresponding respective group of touch nodes in the unmasked touch image (including "background" and "non-background" nodes). For example, a respective noise characteristic can be determined for each respective row and/or for each respective column in the masked touch image. The respective noise characteristic can be removed from the respective row and/or column in the unmasked touch image. In some examples, the noise characteristic can be determined by averaging background touch signals corresponding to touch nodes in a respective row or column of the masked touch image to determine a noise offset that can be subtracted from each touch signal corresponding to touch nodes in a respective row or column of the unmasked touch image. In some examples, the determining and subtracting of the noise characteristic can be repeated iteratively within a window of time and/or until one or more noise criteria are met.

Figure 1B:
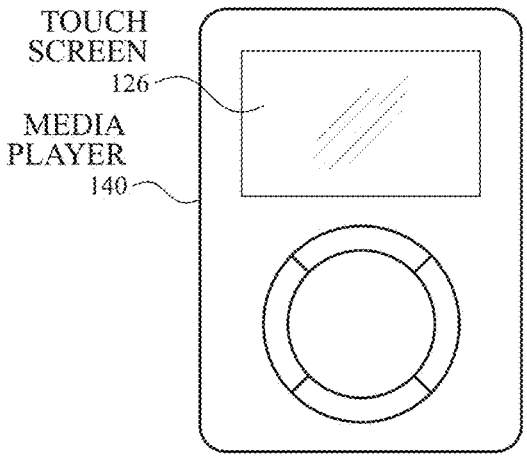
Figure 1C:
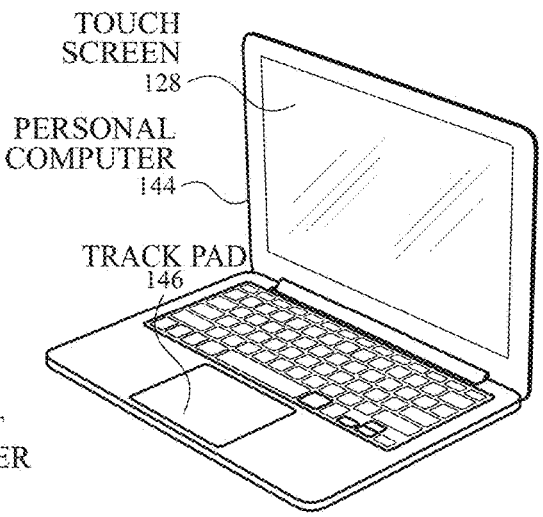
Figure 1D:
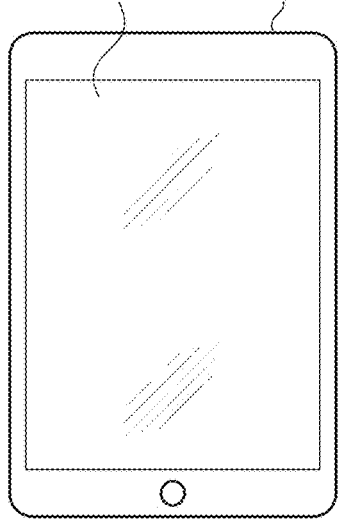
Figure 1E:
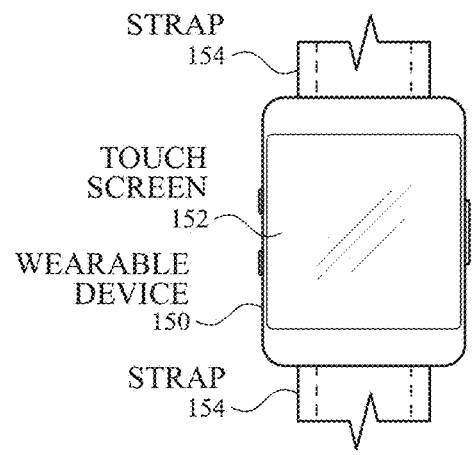

FIGS. 1A-1E illustrate exemplary systems with touch screens that can perform input processing according to examples of the disclosure. As described in more detail herein, the input processing can include suppression of structured noise. FIG. 1A illustrates an exemplary mobile telephone 136 that includes a touch screen 124 and can perform input processing according to examples of the disclosure. FIG. 1B illustrates an example digital media player 140 that includes a touch screen 126 and can perform input processing according to examples of the disclosure. FIG. 1C illustrates an example personal computer 144 that includes a touch screen 128 and a track pad 146 and can perform input processing according to examples of the disclosure (on inputs detected from the touchscreen 128 or track pad 146). FIG. 1D illustrates an example tablet computing device 148 that includes a touch screen 130 and can perform input processing according to examples of the disclosure. FIG. 1E illustrates an example wearable device 150 (e.g., a watch) that includes a touch screen 152 and can perform input processing according to examples of the disclosure. Wearable device 150 can be coupled to a user via strap 154 or any other suitable fastener. It should be understood that the example devices illustrated in FIGS. 1A-1E are provided by way of example, and other types of devices can perform input processing according to examples of the disclosure. Additionally, although the devices illustrated in FIGS. 1A-1E include touch screens, in some examples, input processing according to examples of the disclosure can be performed for touch sensor panels without a display (e.g., track pad 146). In some examples, touch screens 124, 126, 128, 130 and 152 can be based on self-capacitance and/or mutual capacitance. In some examples, a touch screen can be multi-touch, single touch, projection scan, full-imaging multi-touch, capacitive touch, etc.

Figure 2:
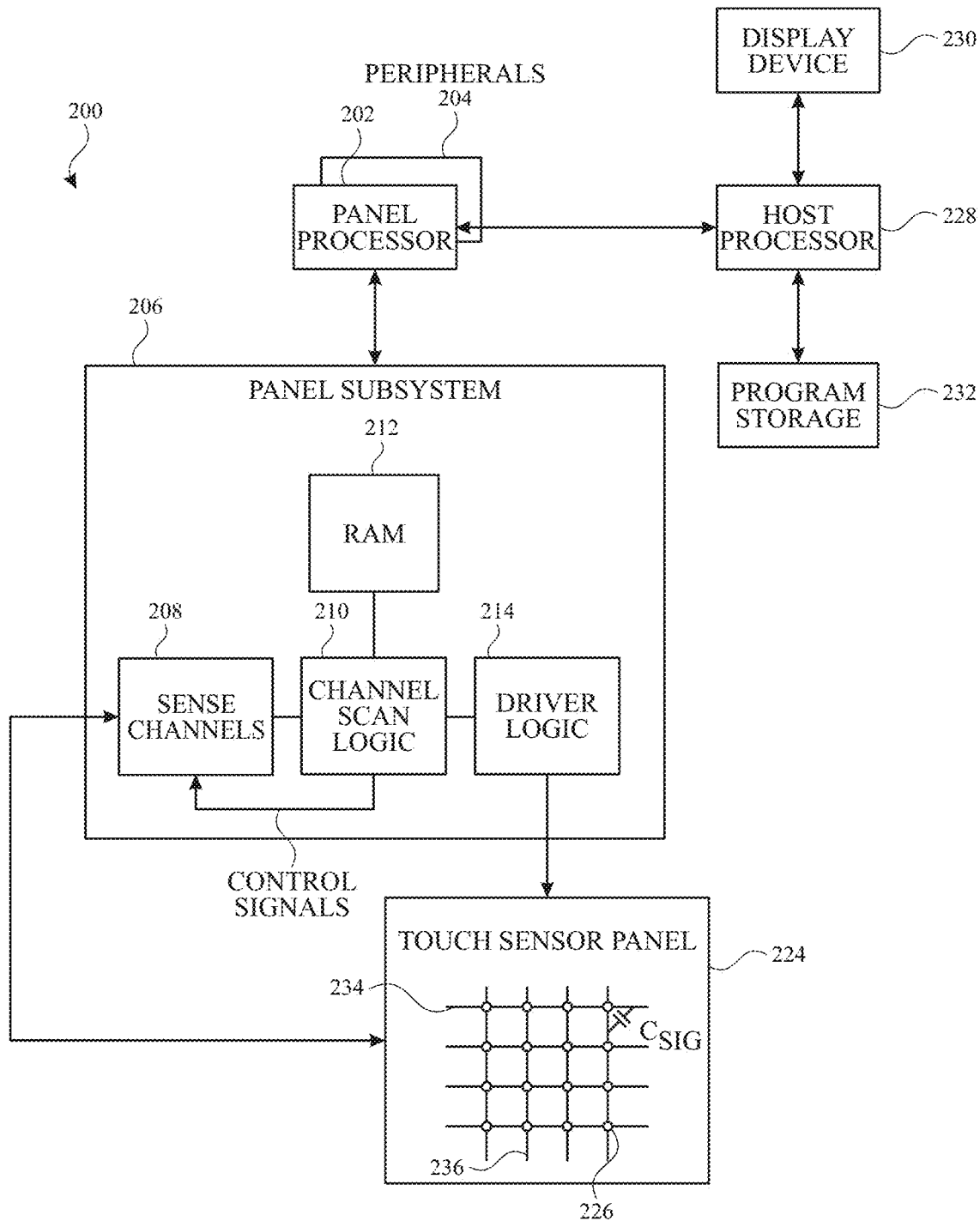
FIG. 2 illustrates an exemplary computing system including a capacitive touch sensor panel that can perform input processing according to examples of the disclosure.

FIG. 2 illustrates an exemplary computing system 200 including a capacitive touch sensor panel 224 that can perform input processing according to examples of the disclosure. Computing system 200 can be included in, for example, mobile telephone 136, digital media player 140, personal computer 144, tablet computing device 148, wearable device 150, or any mobile or non-mobile computing device that includes a touch sensor panel or touch screen. Computing system 200 can include a touch sensing system including one or more panel processors 202, peripherals 204, and panel subsystem 206. Peripherals 204 can include, but are not limited to, random access memory (RAM) or other types of memory or storage, watchdog timers and the like. Panel subsystem 206 can include, but is not limited to, one or more sense channels 208, channel scan logic (analog or digital) 210 and driver logic (analog or digital) 214. Touch sensor panel 224 can include row electrodes 234 and column electrodes 236. In mutual capacitance touch sensor panel examples, stimulation signals from driver logic 214 can be driven onto row electrodes 234, and sense signals on column electrodes 236 can be sensed by sense channels 208 (also referred to as sense circuitry). Touch or proximity events can alter the capacitive coupling Csig between row electrodes 234 and column electrodes 236 at touch nodes 226 and cause a change to the sense signals on column electrodes 236. However, in self-capacitance touch sensor panel examples, driver logic 214 and sense channels 208 can be combined, and the touch sensor panel can be driven and sensed on both row electrodes 234 and column electrodes 236. Channel scan logic 210 can access RAM 212, autonomously read data from sense channels 208 and provide control for the sense channels. In addition, channel scan logic 210 can control driver logic 214 to generate stimulation signals that can be sequentially or simultaneously applied to the row electrodes 234 of touch sensor panel 224. Panel processor 202 can process the data received from scanning the touch sensor panel including suppressing structured noise as described in more detail herein. In some examples, panel subsystem 206, panel processor 202 and peripherals 204 can be integrated into a single application specific integrated circuit (ASIC) that can be referred to herein as a touch controller.

In mutual capacitance sensing examples, touch sensor panel 224 can include a capacitive sensing medium having one or more drive electrodes and one or more sense electrodes. The drive and sense electrodes can be formed from a transparent conductive medium such as Indium Tin Oxide (ITO) or Antimony Tin Oxide (ATO), although other transparent and non-transparent materials such as copper can also be used. The drive and sense electrodes can be formed on a single side of a transparent substrate. Each adjacency of drive and sense electrodes can represent a capacitive sensing node and can be viewed as touch picture element (touch pixel) or touch node 226, which can be particularly useful when touch sensor panel 224 is viewed as capturing an "image" of touch or proximity. (In other words, after panel subsystem 206 has determined whether a touch or proximity event has been detected at each sense electrode in the touch sensor panel, the pattern of sense electrodes in the touch sensor panel at which a touch or proximity event occurred can be viewed as an "image" of touch or proximity (e.g., a pattern of fingers touching the panel or proximate to, but not touching, the panel).) The capacitance between the drive and sense electrodes and local system ground can appear as a stray capacitance Cstray, and the capacitance at the intersections of the drive and sense electrodes, i.e., the touch nodes, can appear as a mutual signal capacitance Csig between the drive and sense electrodes when the given drive electrode is stimulated with an alternating current (AC) signal. The presence of a finger or other object (such as a stylus) near or on the touch sensor panel can be detected by measuring changes to a signal charge present at the nodes being touched, which can be a function of Csig (e.g., a decrease in mutual capacitance). Each sense electrode of touch sensor panel 224 can be coupled to a sense channel 208 in panel subsystem 206. As used herein, an electrical component "coupled to" or "connected to" another electrical component encompasses a direct or indirect connection providing electrical path for communication or operation between the coupled components. Thus, for example, sense electrodes of touch sensor panel 224 may be directly connected to sense channels 208 or indirectly connected to sense channels (e.g., via switching circuitry), but in either case provided an electrical path for sensing the sense electrodes. Touch sensor panel 224 can cover a portion or all of a surface of a device.

In some self-capacitance sensing examples, the touch sensor panel 224 can include a matrix of small plates of conductive material that can be referred to as a touch pixel, touch node, or a touch pixel electrode or touch node electrode. The touch nodes can be formed from a transparent conductive medium such as ITO or ATO, although other partially or fully transparent and non-transparent materials such as copper can also be used. In some examples, the conductive plates can be formed from other materials including conductive polymers, metal mesh, graphene, nanowires (e.g., silver nanowires) or nanotubes (e.g., carbon nanotubes). The touch nodes can be formed on a single side of a transparent substrate. In some examples, a touch screen can include a plurality of individual touch nodes, each touch node identifying or representing a unique location on the touch screen at which touch or proximity (i.e., a touch or proximity event) is to be sensed, and each touch node being electrically isolated from the other touch nodes in the touch screen/panel. Such a touch screen can be referred to as a pixelated touch screen. During self-capacitance operation of the pixelated touch screen, a touch node can be stimulated with an AC waveform (from the driver logic 214), and the self-capacitance to ground of the touch node can be measured. As an object approaches the touch node, the self-capacitance to ground of the touch node can change (e.g., increase). This change in the self-capacitance of the touch node can be detected and measured by the touch sensing system to determine the positions of multiple objects when they touch, or come in proximity to, the touch sensor panel. Each touch node of touch sensor panel 224 can be coupled to a sense channel 208 in panel subsystem 206. Touch sensor panel 224 can cover a portion or all of a surface of a device. In some examples, the electrodes can be formed from rows and columns of conductive material, and changes in the self-capacitance to ground of the rows and columns can be detected.

In some examples, touch screens 124, 126, 128, 130 and 152 can be based on mutual capacitance and/or self-capacitance. The electrodes can be arrange as a matrix of small, individual plates of conductive material or as drive lines and sense lines (e.g., as in touch sensor panel 224 in FIG. 2), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Computing system 200 can also include host processor 228 for receiving outputs from panel processor 202 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to panel processing, and can be coupled to program storage 232 and display device 230 such as an LCD display (or an LED display or OLED display) for providing a UI to a user of the device. Display device 230 together with touch sensor panel 224, when partially or entirely overlapping with the touch sensor panel, can form a touch screen.

In some examples, touch sensor panel 224 and display device 230 together can form an integrated touch screen in which touch nodes of the touch sensing system can be integrated into the display pixel stack-ups of display device 230. The circuit elements in an integrated touch screen can include, for example, elements that can exist in LCD or other displays (LED display, OLED display, etc.), such as one or more display pixel transistors (e.g., thin film transistors (TFTs)), gate lines, data lines, pixel electrodes and common electrodes. It is noted that circuit elements are not limited to whole circuit components, such as a whole capacitor, a whole transistor, etc., but can include portions of circuitry, such as only one of the two plates of a parallel plate capacitor. In some configurations, each common electrode in an integrated touch screen can serve as a multi-function circuit element that can operate as display circuitry of the display system of the touch screen and can also operate as touch nodes of the touch sensing system. Specifically, each common electrode can operate as a common electrode of the display circuitry of the touch screen (e.g., during a display phase), and can also operate as a common electrode (i.e., a touch node) of the touch sensing system of the touch screen (e.g., during a touch sensing phase). It should be understood that a display phase and a touch sensing phase of an integrated touch screen may be operated at the same time, e.g., partially or completely overlapping, or the display phase and touch sensing phase may operate at different times.

In general, each of the touch nodes may be either a multi-function circuit element that can form part of the touch sensing system and can perform one or more other functions, such as forming part of the display circuitry, or may be a single-function circuit element that can operate as a touch node only. Similarly, each of the display circuit elements may be either a multi-function circuit element that can operate as display circuitry and perform one or more other functions, such as operating as a touch node, or may be a single-function circuit element that can operate as display circuitry only. Therefore, in some examples, some of the circuit elements in the display pixel stack-ups can be multi-function circuit elements and other circuit elements may be single-function circuit elements. In other examples, all of the circuit elements of the display pixel stack-ups may be single-function circuit elements.

Note that one or more of the functions described herein, including the processing of inputs according to examples of the disclosure, can be performed by firmware stored in memory (e.g., one of the peripherals 204 in FIG. 2) and executed by panel processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 3:
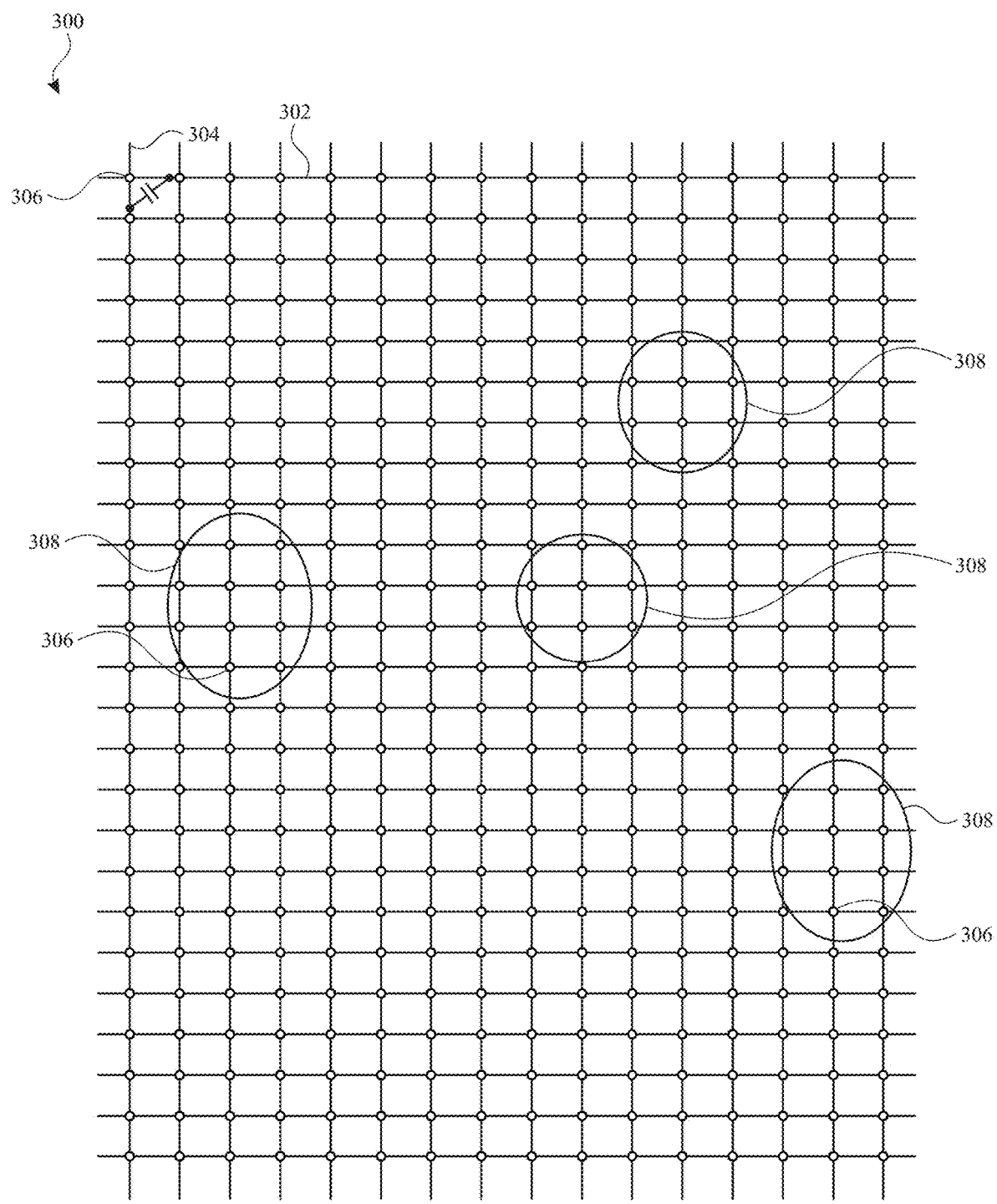
FIG. 3 illustrates an exemplary representation of an image of touch according to examples of the disclosure.

As described above, capacitive measurements (touch signals or data) at the touch nodes of touch sensor panel 224 can be viewed as an image of the touch (or touch image) when processed by panel processor 202 and/or host processor 228. FIG. 3 illustrates an exemplary representation of an image of touch according to examples of the disclosure. Touch screen 300 can include drive lines 302 and sense lines 304 arranged as a pattern of rows and columns, although other patterns can be possible (e.g., the touch nodes of a pixelated touch sensor panel). Touch nodes 306 can be formed at the intersection between drive lines 302 and sense lines 304, and the mutual capacitance (or change in mutual capacitance) therebetween can be measured. Each object touching or proximate to, but not touching, the touch screen 300 can produce a touch signal at proximate touch nodes 306. By processing the touch image, touch signals from proximate touch nodes 306 (e.g., those touch signals meeting a threshold signal level) can be grouped together to form input patches 308 in a multi-touch image segmentation process. Thus, the input patches 308 can be regions within the image of touch corresponding to touch nodes 306 having signal values produced by an object touching (or proximate to, but not touching, in some examples) the touch screen 300. The input patches identified in a touch image can be tracked through multiple successive touch images. Input patches from a corresponding object captured across multiple touch images can be assigned to a corresponding path. Assigning input patches to paths can allow for tracking gesture inputs (e.g., swipe, pinch, etc.). In some examples, the path can track the input contact from an initial touchdown on the touch-sensitive surface through a liftoff from the touch-sensitive surface. In some examples, the input patches of a path can be analyzed to identify movement of the input patch across one or more touch images and thereby track movement of an object corresponding to the input patches. Although a path can be used to identify movement, some paths may not include movement (e.g., when the input patch remains in the same position from touchdown to liftoff, such as in a tap). The tracking can include tracking position, velocities, and/or geometries (e.g., shape, number of touch nodes) of the input patches from various touch images corresponding to a path.

Various characteristics can be computed for each input patch in the touch image that can be used for further processing. For example, each input patch can be characterized by total signal, peak signal (or maximum signal), minimum signal, position, shape, size and/or orientation. In some examples, each input patch can be represented by an ellipse defined by a centroid (location of touch), major and minor axis lengths and/or a major axis (and/or minor axis) orientation (or alternatively an x-axis radius and a y-axis radius). In some examples, the number of touch nodes, peak signal, total signal and/or signal density for each input patch can be computed. In some examples, the number of touch nodes, peak signal and/or peak signal density can be tracked for each path across multiple touch images.

For example, the number of touch nodes in a path can be calculated by counting the number of touch nodes with the threshold signal level included in the input patch. The peak signal can, for example, be calculated by taking the maximum signal measured at the touch nodes included in the input patch. An input patch's total signal can, for example, be calculated by summing the square of the signal value at each touch node in the input patch. Thus, total signal for an input patch can be expressed mathematically as in Equation (1):

$$Z_P = \sum_{i,j \text{ in } P} [V_{[i][j]}^2] \qquad (1)$$

where $Z_P$ can represent the total signal for an input patch, V can represent the signal value at a touch node and i, j can represent the row and column coordinate of each touch node. In some examples, the signal value at each touch node can be calibrated (e.g., normalized) before computing the total signal.

An input patch's signal density can be computed based on the input patch's total signal. In some examples, an input patch's signal density can be calculated by dividing the total signal for an input patch by the geometric mean radius of the input patch. In other examples, the input patch's signal density can be calculated by dividing the total signal for an input patch by the number of touch nodes in the input patch. Thus, signal density for an input patch can be expressed mathematically, for example, as in Equations (2) or (3):

$$Z_{density,P} = \frac{Z_P}{\text{geometric mean radius of } P} \qquad (2)$$

$$Z_{density, P} = \frac{Z_P}{\text{number of touch nodes forming } P} \quad (3)$$

A multi-touch sensing system may use a segmentation process to discriminate between different input patches and compute characteristics for some or all input patches identified in an acquired image. Touch detection performance for touch sensing systems, however, can be degraded by the introduction of noise from various aggressors (sources of noise resulting in sensor errors manifesting as structured image artifacts), including, but not limited to, chargers (AC adaptors, inductive charging circuitry, etc.), display circuitry (e.g., liquid crystal matrix (LCM) of a liquid crystal display (LCD), Organic Light Emitting Diode (OLED) display's when writing certain types of image) or other sources (fluorescent lights, radiated noise or radio frequency (RF) interference). Some of these noise aggressors can be avoided or mitigated by adjusting touch sensing parameters (e.g., stimulation signal amplitude, integration time) or by switching to a clean frequency determined during a spectral analysis, for example. During the spectral analysis, the system can sense the sense lines when no stimulation signals are applied to the drive lines to detect noise in the system at one or more different frequencies. A frequency for touch sensing can be selected to reduce the noise levels.

As described herein, in some examples, structured noise can be suppressed (e.g., filtered) by input processing (e.g., before segmentation and parameterization of input patches). Structured noise can result in touch images from a touch-sensitive device's susceptibility to noise from various sources including power supplies and other internal components, for example. Structured noise described herein refers to noise that manifests itself in sensor errors that can appear as a pattern in a touch image (image artifact), which can be static or dynamic. Although static noise may be filtered using baselining techniques or through calibration of sensing circuitry, dynamic structured noise in which the pattern appears at different parts of a touch image in different frames may not be filtered out with conventional techniques. Structured noise can appear in a touch image as noise that appears along select rows and/or select columns of a touch image. In some examples, noise can appear as a constant offset to one or more rows and/or columns, where the affected row(s) and/or column(s) can be different during different touch frames. In some examples, the noise can appear with a linear or non-linear characteristic (e.g., can be modeled by a linear or non-linear function rather than as a constant offset) across the affected row(s) and/or column(s). Although generally described herein as applying to rows and/or columns, structured noise can appear in other patterns.

FIGS. 4A-4C illustrate an exemplary touch on a touch sensor panel and corresponding touch images at different times according to examples of the disclosure. FIG. 4A illustrates a touch screen 400 (e.g., corresponding to mobile telephone 136 in FIG. 1A) with a contact 402 from an object such as a finger on the surface of touch screen 400. Plots 420 and 430 in FIGS. 4B and 4C respectively represent corresponding touch images captured at different times. The grayscale of the touch images can correspond to the signal intensity, where black can correspond to zero or low signal intensity (e.g., corresponding to untouched portions of the touch sensor panel 400) and white can correspond to maximum or high signal intensity (e.g., corresponding to the contact 402 on touch sensor panel 400). FIGS. 4B and 4C both include structured or patterned noise. For example, the signal intensity of certain rows or columns in the touch image can appear as bars and/or stripes. In some examples, a respective group (e.g., row or column) can have uniform intensity offsets or near uniform intensity offsets (within a threshold of one another) due to noise. A different respective row or column can also have uniform or near-uniform intensity offsets, but of a different magnitude. In some examples, a respective row or column can have intensity offsets which follow (or nearly follow within a threshold) a linear or non-linear function of position along the respective row or column. Different respective rows and/or columns can also have intensity offsets which follow or nearly follow a different linear or non-linear function (e.g., different coefficients, different functions). The structure of the noise along rows and/or columns (or other groups of touch nodes) can be used to remove noise from the touch image as described herein. For example, the structure of the noise for a respective row or column can be determined using touch nodes at which no touch is detected ("background" touch nodes), but the structure of the noise can allow for the removal of the noise even from portions of the touch image including touch because the noise characteristic can apply to these portions of the touch image as well. Although FIGS. 4B and 4C both include structured or patterned noise, in some examples, the structure or pattern of noise can dynamically change. For example, the structure or pattern of noise illustrated in FIG. 4B is different than the structure or pattern of FIG. 4C. Suppressing structured noise from touch images can improve touch sensing performance.

Figure 5:
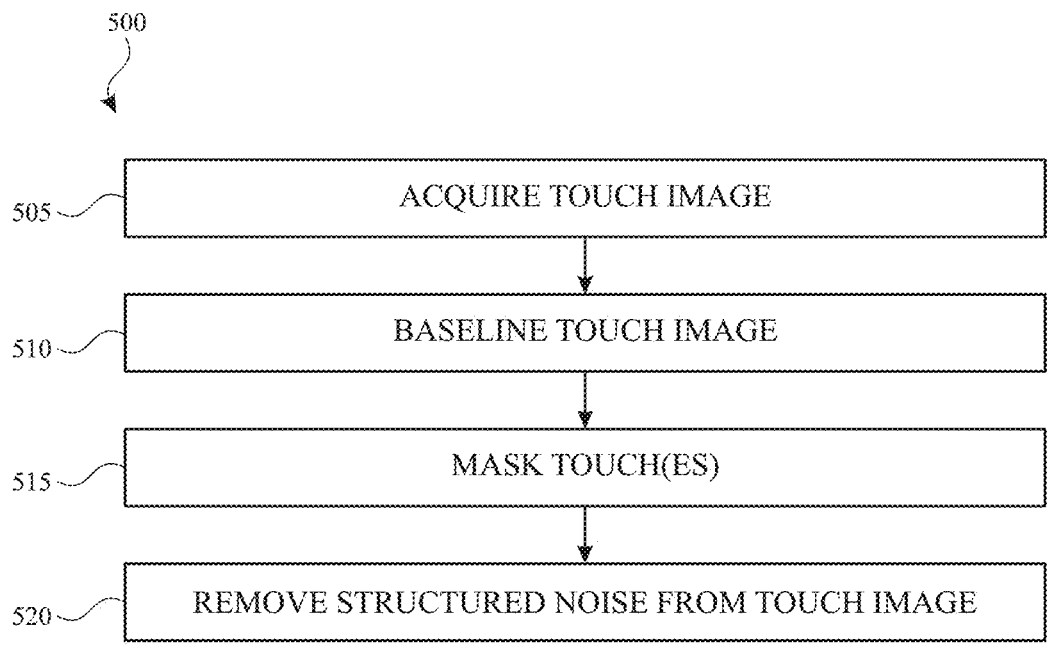
FIG. 5 illustrates an exemplary process for processing a touch image to remove structured noise according to examples of the disclosure.

FIG. 5 illustrates an exemplary process 500 for processing a touch image to remove structured noise according to examples of the disclosure. At 505, a touch image can be acquired. The touch image can include touch node measurements for the touch nodes in the touch sensor panel of an electronic device (e.g., in a given frame). At 510, the acquired touch image can be baselined to filter out static noise (background signals). At 515, potential touches in the touch image can be masked out (e.g., using a touch/background mask image). At 520, the processing to remove structured noise can be applied to remove noise from the touch image. Further details regarding process 500 are described below.

As described above, baselining at 510 can be used to remove static noise (background signals). In some examples, the baseline touch data (e.g., represented in a baseline image) can correspond to touch data captured when there is no touch activity on the touch screen. The electronic device can utilize baseline touch data in order to remove background signal and noise to determine the location(s) and/or amount(s) of touch on the touch screen. In some examples, the electronic device can have stored in its memory such baseline touch data for use in baselining. In some examples, the electronic device can acquire baseline touch data for each type of touch scan it performs (e.g., self-capacitance, mutual capacitance, common mode, active mode, etc.), and for each frequency it might utilize for each of those types of scans (e.g., each of a predetermined number of frequencies that may be analyzed by a spectral analysis scan to identify a low noise frequency at which to perform touch scans).

In some examples, the baseline image can be periodically updated. The actual touch data measured on the touch screen when there is no touch activity on the touch screen can change over time due to changes in temperature, humidity or other environmental conditions at the electronic device. Updating the baseline image(s) can account for these changes. In some examples, the baseline image can be updated every frame. In some examples the baseline image can be updated every N frames (e.g., 3 frames, 10 frames, etc.). In some examples, the baseline image can be updated based on a triggering condition (e.g., change in temperature or humidity or motion measured by other sensors in the device).

As described herein, a mask (mask image) can be generated to mask potential touches in the touch image at 515. The mask can be used to focus the structured noise removal processing on touch nodes having touch signals that may correspond to background noise and exclude touch nodes having touch signals that may correspond to touches by objects or other non-background signals. It should be understood that the classification of a touch node as "background" or "non-background" (including "touch") in the mask does not necessarily mean that the touch signal actually measured at the corresponding touch node includes noise and/or touch signals. Rather, a "background" classification applies to a touch node whose measurement meets one or more "background" criteria such that it can be used for structured noise removal at 520 and a "non-background" classification applies to a touch node whose measurement fails to meet the one or more "background" criteria, and thereby can be excluded from the determination of a noise characteristic. A "touch" classification can be a sub-set of the "non-background" classification and can apply to a touch node whose measurement meets one or more "touch" criteria such that it can be excluded from the structured noise removal at 520.

Additionally, although FIG. 5 illustrates the structured noise removal at 520 for each touch image, in some examples, the noise removal process may not be performed continuously for each touch image. In some examples, the noise removal process can be triggered under conditions indicating structured noise may be present and disabled otherwise. For example, structured noise may result from painting certain types of images on a display (e.g., spreadsheets with gridlines separating cells). In some examples, the structured noise suppression can be triggered by detecting these types of images. Alternatively, the structured noise suppression can be triggered when an application that may display these types of images is actively displayed on the screen (or active in the background). In some examples, the structured noise may result from charging. In such examples, the structured noise suppression can be triggered when charging is detected and disabled otherwise. In some examples, the structured noise suppression can be continuously operating in an active state, but disabled in a low-power state.

Figure 6:
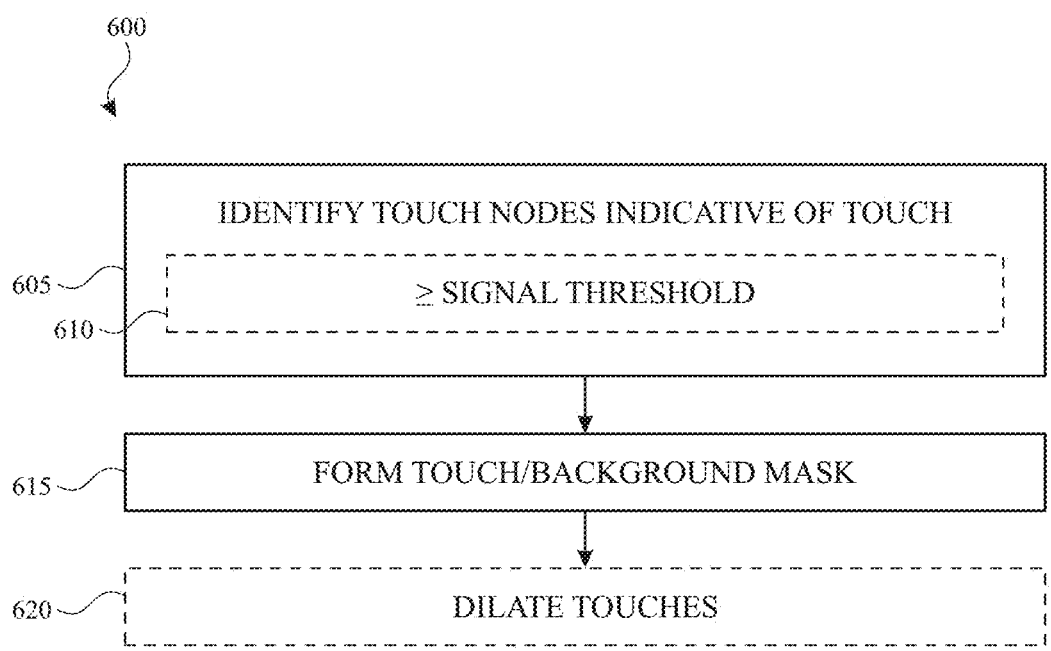
FIG. 6 illustrates an exemplary process for generating a mask according to examples of the disclosure.

FIG. 6 illustrates an exemplary process 600 for generating a mask (mask image) according to examples of the disclosure. Process 600 can correspond to 515 in process 500. At 605, one or more touch nodes can be identified as meeting one or more criteria for a potential touch. In some examples, the one or more criteria can include a criterion that a touch signal of the touch node meets (e.g., greater than or equal to) a threshold to be identified as corresponding to a potential touch for the noise suppression algorithm (610). The threshold can be set, in some examples, based on the maximum signal possible for the system, based on the maximum signal measured in a touch image of a particular frame, or based on a signal gradient of in a touch image of a particular frame. At 615, a mask can be formed. In some examples, the generation of a mask can include generating a mask image of the same dimensions as the touch image. The mask image can, for example, include zeros for touch nodes classified as "touch" (and/or "non-background") and ones for touch nodes classified as "background" such that the product of the baselined touch image and mask image results in a resulting masked touch image including measurements from only touch nodes classified as "background." Optionally, the touch nodes classified as "touch" can be dilated in the mask image at 620. Dilating the touches can provide some margin around touch nodes classified as "touch" to ensure that touch nodes having touch signals that fail to meet the one or more criteria for touch, but may include some component of touch signal, can be properly excluded (e.g., as "non-background"). Classifying touch nodes including some touch signal as "background" can result in degradation of touches (e.g., by removing some touch signal in addition to background noise).

Figure 7:
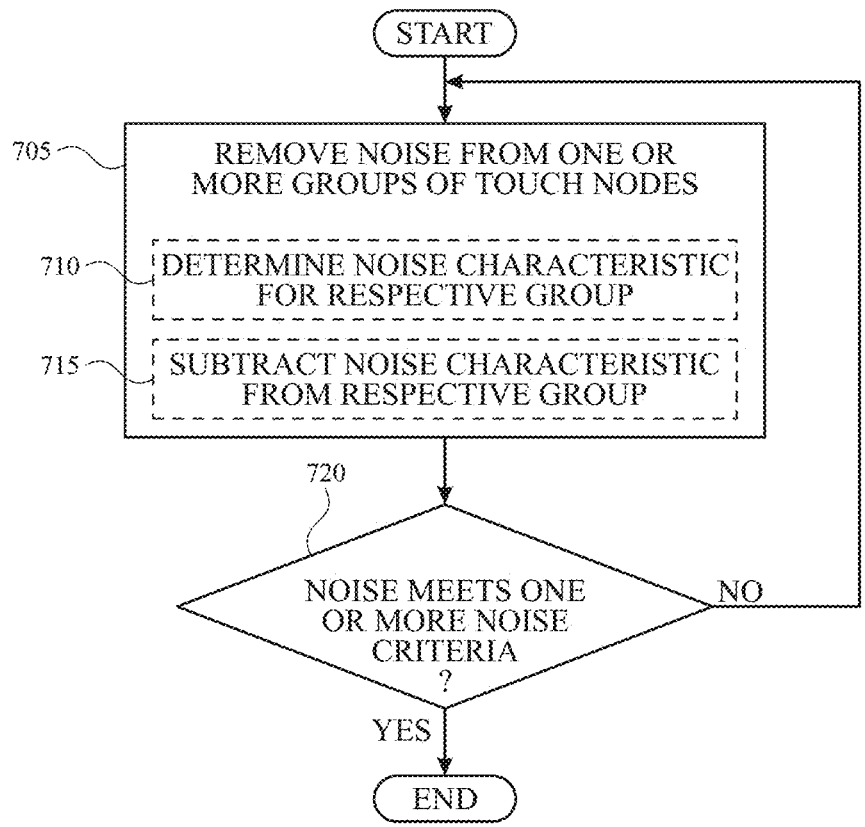
FIG. 7 illustrates an exemplary process for removing structured noise from a touch image according to examples of the disclosure.

As described above, structured noise can be removed from the touch image at 520. FIG. 7 illustrates an exemplary process 700 for removing structured noise from a touch image according to examples of the disclosure. Process 700 can correspond to 520 in process 500. At 705, noise can be removed from one or more groups of touch nodes of the touch image. Generally, the groups of touch nodes can be defined to correspond to the structured noise. For example, the groups can correspond to rows and/or columns of a touch image where the structured noise appears as across rows and/or columns of the touch image, as illustrated in FIGS. 4B-4C. In some examples, removing noise for a respective group of touch nodes can include determining, at 710, a noise characteristic of the touch nodes in the group in the masked touch image ("background" touch nodes). Removing noise for a respective group of touch nodes can include subtracting, at 715, the determined noise characteristic from the touch nodes in the group in the touch image. At 720, the system can determine whether the noise remaining in the touch image meets one or more noise criteria. When the noise remaining in the touch image meets the one or more noise criteria, the noise removal process can end. When the noise remaining in the touch image fails to meet the one or more noise criteria, the system can perform another iteration of process 700.

As described above, in some examples, the groups can be defined as rows and/or columns. In some examples, the noise can appear as a constant offset to rows and/or columns, and the noise characteristic to be determined can be a noise offset. To remove noise from the one or more rows and/or the one or more columns, the noise offset for the respective row and/or column can be determined and subtracted from the respective row and/or column. For example, in a first iteration of 705, a noise offset can be computed for a first respective row of the touch image by computing an average of the touch signals in the masked touch image for the respective row. For example, the touch signals of "background" touch nodes in the respective row in the masked touch image can be summed and divided by the number of "background" touch nodes in the respective row in the masked touch image. The average noise offset for the respective row can then be subtracted from touch signals at each touch node of the respective row in the (unmasked) touch image. The determination of the noise offset for a respective row of the masked touch image and subtraction of the noise offset from the respective row of the unmasked touch image can be repeated for each row in the touch image. Similarly, the determination of the noise offset for a respective column of the masked touch image and subtraction of the noise offset from the respective column of the unmasked touch image can be repeated for each column in the touch image. In some examples, the determining and removing of the noise characteristic can be applied to each of the rows and each of the columns in the touch image for each iteration of 705.

Although described as first determining a noise characteristic and removing the noise characteristic for respective rows and then repeating the same procedure for the columns, in some examples the determining and removing of the noise characteristic can be applied to columns first and then rows. In some examples, determining and removing of the noise characteristic can be applied first in the dimension (rows or columns) in which the structured noise manifests most. In some examples, the determining and removing of the noise characteristic can be performed for rows only or columns only depending on the structure of the structured noise.

In some examples, rather than using an average, the noise characteristic of the offset can be determined using a median or mode of the "background" touch signals in the masked touch image. In some examples, the noise can appear with a linear or non-linear characteristic (e.g., can be modeled by a linear or non-linear function rather than as a constant offset) across the affected row(s) and/or column(s). In such examples, rather than determining a noise characteristic that can be a constant offset, a linear or non-linear function can be fit to the touch signals in the masked touch image and subtraction of the noise can be based on the linear or non-linear function (e.g., as a function of the location of the touch node in the row/column). Whether to use a constant offset, linear function offset or non-linear function offset can be determined based on the physical properties of the system. For example, a touch sensor panel with long routing traces or long sensor electrodes may exhibit a linear change in the noise offset (e.g., a ramp) from attenuation due to impedance. In some examples, a linear function can be determined using a linear regression technique based on the touch signals corresponding to "background" touch nodes in the masked touch image. In some examples, rather than a complete linear regression, slopes can be determined for sets of two touch signals corresponding to "background" touch nodes in a respective row or column in the masked touch image, and an average, median or mode of the slope measurements for multiple sets can be used to define the linear noise offset for the respective row or column. It should be understood that these are simply examples of line fitting techniques, and other line fitting techniques or non-linear curve fitting techniques can be used.

In some examples, the same noise characteristic (e.g., constant, linear function, non-linear function) can be used for each respective row or column. In some examples, the noise characteristic can different for different respective rows or columns. For example, when the variance in a row is above a threshold, a linear or non-linear function could be used to determine a noise characteristic, but when variance in the row is below the threshold, a constant offset noise characteristic can be used. In some examples, a first type of noise characteristic can be used for respective rows and a second type of offset characteristic can be used for columns. In some examples, different iterations of process 700 can use different noise characteristics. For example, a first iteration can determine constant offsets characteristics for rows and/or columns and a second iteration can determine linear function offset noise characteristics for rows and/or columns.

As illustrated in FIG. 7, process 700 can iteratively remove noise from the touch image until satisfaction of one or more noise criteria. In some examples, the one or more noise criteria can be satisfied when the amplitude of noise at all "background" touch nodes are within a threshold amount of zero (or at zero). In some examples, the one or more noise criteria can be satisfied when a threshold number or percentage of "background" touch nodes (e.g., 80% of the "background" touch nodes) are within the threshold amount of zero (or at zero). In some examples, the one or more noise criteria can include a criterion that can be satisfied when a statistical parameter (e.g., variance, spectral density) rather than the signal level of the noise of "background" touch nodes is met. For example, a criterion can be satisfied when the distribution of signal level at the "background" touch nodes resembles a white noise distribution. Although process 700 illustrates iteratively removing noise until one or more noise criteria are satisfied, in some examples the removal of noise can include one or more iterations that can complete within an allotted time period. In some examples, the allotted time period can allow for an integer number of iterations (e.g., 5, 10, etc.). In some examples, when the one or more noise criteria are met during the allotted time period, the iterations can stop. In some examples, the iterations can occur during the allotted time period irrespective of the one or more noise criteria. In such examples, rather than monitoring and using the one or more noise criteria at 720, the determination of whether to perform another iteration can be based on the number of iterations performed or the time remaining during the allotted period, for example. In some examples, the number of iterations required for suppressing noise in a threshold percentage of touch images can be empirically determined, and the duration of the allotted time period can correspond to the duration of the empirically determined number of iterations. It should be understood that the one or more iterations in the allotted time period can introduce delay in touch input processing. In some examples, the duration of the allotted time period can be set to meet a delay criterion (e.g., less than a threshold delay) to not degrade touch performance by introducing a lag.

Figure 8:
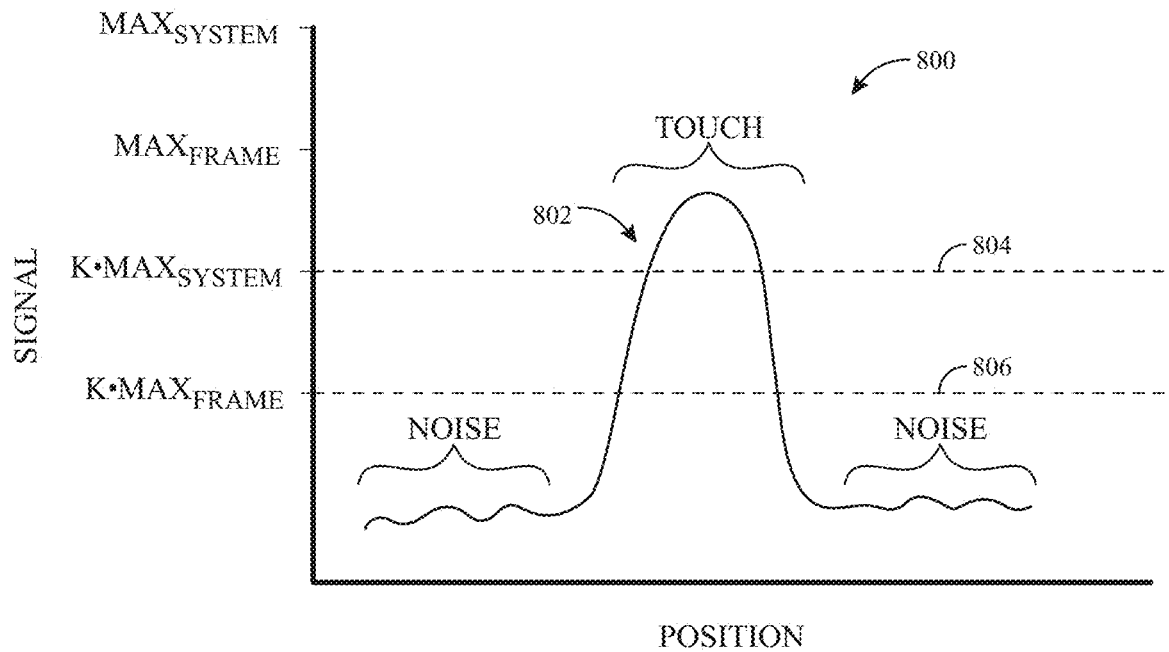
FIG. 8 illustrates exemplary thresholds that can be used to identify touch nodes corresponding to potential touches according to examples of the disclosure.

As described above, masking touches can include identifying one or more touch nodes meeting one or more criteria for a potential touch (and/or classifying touch nodes and "background" or "non-background"). For example, a touch node whose touch signal is greater than or equal to a threshold can be identified as corresponding to a potential touch (classified as "touch"). FIG. 8 illustrates exemplary thresholds that can be used to identify touch nodes corresponding to potential touches according to examples of the disclosure. FIG. 8 illustrates plot 800 including an exemplary signal profile 802 for a cross section of a touch sensor panel corresponding to an object touching the touch sensor panel near the center of the cross section. The signal profile can include touch signals corresponding to the touch at some touch nodes and touch signals corresponding to noise at other touch nodes. In some examples, the signal threshold for identifying a touch node corresponding to a touch can be set based on a maximum signal for the system. For example, the touch sensing signal can accept a range of inputs (e.g., limited by the dynamic range of the sense amplifier) including a maximum touch signal for the system. In such examples, the signal threshold can be set to a percentage (e.g., 50%, 60%) of the maximum touch signal for the system (e.g., as shown by threshold 804). In some examples, the signal threshold for identifying a touch node corresponding to a touch can be set based on a maximum signal detected in a touch image (in the frame which the noise suppression algorithm is to be applied to the touch image). In such examples, the maximum signal among the touch nodes in the touch image can be found, and the threshold can be set to a percentage (e.g., 50%, 60%) of the maximum signal in the touch image (e.g., as shown by threshold 806).

In some examples, rather than using the maximum touch signal for the system or the maximum touch signal for the specific touch image, the threshold can be set based on empirical data of touch signals corresponding to touches by various objects measured by the system. The threshold could be set as a percentage of a minimum or mean of the peak touch signals in the empirical data for various touches, for example. In some examples, the signal threshold for identifying a touch node corresponding to a touch can be set to the signal value measured at the maximum signal gradient in the touch image. The maximum signal gradient can occur between touch signals due to a touch and touch signals due to noise.

Figures 9B, 9C, 9D, 9E:
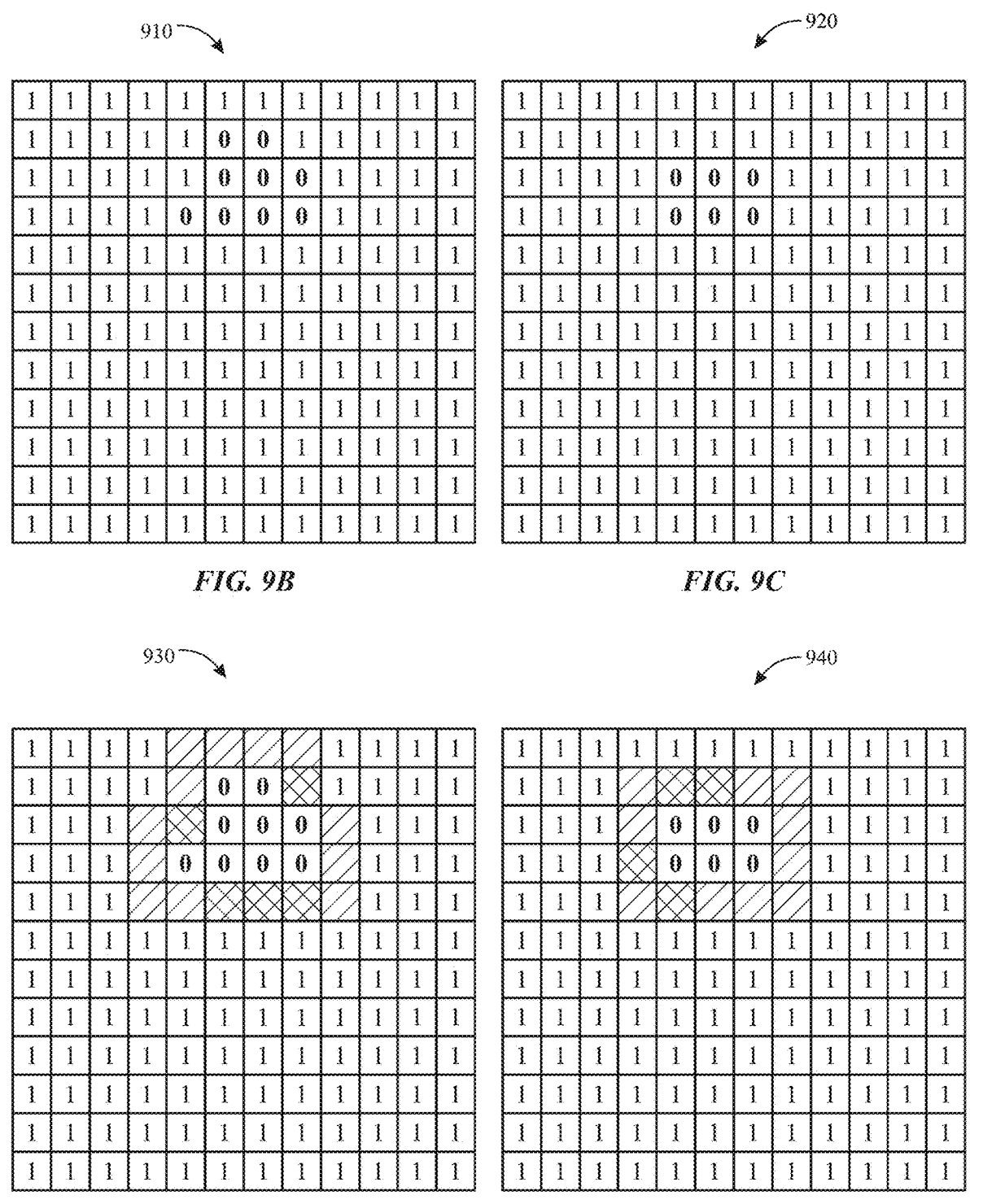

FIGS. 9A-9E illustrate exemplary images including an exemplary touch image and exemplary mask images according to examples of the disclosure. FIG. 9A illustrates an exemplary touch image 900 according to examples of the disclosure. Each box in touch image 900 can correspond to a touch node in an array of touch nodes (e.g., 12×12), with the number inside each box representing a signal level measured at the corresponding node. The numbers can be normalized to a range from 0-100, where 0 corresponds to no change in capacitance (e.g., after the baseline image is removed from the touch image at 510) and 100 corresponds to the signal maximum for the system. Touch image 900 can be captured while an object (e.g., a finger) contacts the touch-sensitive surface including the array of touch nodes, represented by contact 902. As illustrated in FIG. 9A, the touch image can include touch nodes capturing the changes in capacitance due to the object at and in proximity to contact 902 (represented by relatively large touch signals). Other touch nodes of touch image 900 distant from contact 902 can measure noise without touch (represented by relatively small touch signals). As described above, touch nodes can be identified as corresponding to "touch" when their touch signal exceeds a threshold. In some examples, the signal threshold can be set at a percentage of the maximum signal possible for the system. For the normalized range of touch signal values from 0-100 for the system, the threshold can be set at a percentage of that maximum value (e.g., 50, 60, etc.). In some examples, the signal threshold can be set at a percentage of the maximum signal in the touch image. In FIG. 9A, the maximum signal in touch image 900 can be identified as 86. The threshold can be set as a percentage of this maximum value (e.g., set at 43 or 50% of 86).

Mask images can be generated using a signal threshold. FIGS. 9B and 9C illustrate exemplary mask images according to examples of the disclosure. FIG. 9B illustrates a mask image 910 generated using a threshold (first threshold) set at 50% of the maximum signal in touch image 900. Each box in mask image 910 can include a number representing a classification of the corresponding node as "touch" (represented by "0" in FIGS. 9B-9E) or "background" (represented by "1" in FIGS. 9B-9E). Nine measurements in touch image 900 meet the threshold value (43) to be classified as "touch" and the remainder can be classified as "background." FIG. 9C illustrates a mask image 920 generated using a threshold set at 50% of the maximum signal for the system. Each box in mask image 910 can include a number representing a classification of the corresponding node as "touch" or "background." Six measurements in touch image 900 meet the threshold value (50) to be classified as "touch" and the remainder can be classified as "background."

As described above, touches in the masked image can be dilated. FIGS. 9D and 9E illustrate exemplary mask images including dilated touches according to examples of the disclosure. Mask images 930 and 940 can correspond to mask images 910 and 920, respectively. However in addition to the touch nodes classified as "touch" by meeting the first threshold (indicated by "0"), these touches can be dilated to provide additional margin around touches and can be classified as "non-background". For example, the shaded boxes (unidirectional or bidirectional crosshatching) in mask images 930 and 940 can correspond to touch nodes classified as "non-background" by dilation that are not classified as "touch" under the first threshold. FIGS. 9D-9E illustrate a uniform margin of one touch node around touch nodes previously classified as "touch" under the first threshold. It should be understood, however, that the dilation of touches can be non-uniform. For example, greater (e.g., two) or fewer (e.g., zero) touch nodes can be included in the dilation. Additionally, in some examples, the dilation of touches can include further margin to result in a region of a specific shape classified as "non-background" (e.g., a rectangle or square). For example, the dilation of touch in FIG. 9E may result in a rectangular region classified as "non-background" (including "touch"), whereas the dilation of touch in FIG. 9D may not. In such examples, further touch nodes can be classified as "non-background" so that the region classified as "non-background" can be rectangular in FIG. 9E as well. In some examples, the dilation can depend on the signal level of touch nodes proximate to touch nodes previously classified as "touch" using the first threshold. In such examples, the touch nodes proximate to (e.g., within a threshold distance of) touch nodes previously classified as "touch" using the first threshold can be compared with a second threshold. The second threshold can be lower than the first threshold used for the initial classification of touch nodes as "touch" or "background." For example, the second threshold can be a percentage (e.g., 80%) of the first threshold. As illustrated in FIGS. 9D and 9E, the shaded boxes with bidirectional crosshatching can correspond to touch nodes meeting this relaxed second threshold to be included in the dilation as "non-background," whereas the shaded boxes with unidirectional crosshatching be classified as "background." Additionally or alternatively, in some examples, a predetermined percentage of the remaining touch nodes (after excluding touch nodes above the first threshold) previously classified as "background" based on the first threshold can be classified as "non-background" or "background." In some examples, 50% of the remaining touch nodes previously classified as "background" with the highest signal levels can be reclassified as "non-background" and the remaining 50% with the lowest signal levels can remain classified as "background." In some examples, another distribution rather than 50%-50% of the remaining touch nodes previously classified as "background" can be used.

Although touch image 900 includes only positive values, in some examples, the change in capacitance measured at one or more touch nodes can be negative. In some examples, the negative touch nodes can be masked out like touches. In some examples, the negative touch nodes can be forced to zero. In some examples, compensation can be applied to the negative touch nodes before (or after) removing structured noise. Additionally, although touch image 900 corresponds to one contact 902, in some examples, the touch image can include multiple contacts and each contact can be masked in a similar fashion.

Although FIG. 5 illustrates the masking of touches at 515 once before removing noise from the touch image, in some examples, the mask image can be recomputed during the iterations of process 700. For example, the mask image can be formed according to process 600 before the first iteration of process 700, and then re-formed according to process 600 before a next iteration of process 700. In some examples, re-forming the mask image for a subsequent iteration can skip some of the steps of process 600. For example, the identification of touch nodes at 605 in the initial mask can be retained to prevent the erosion of touch and need not be repeated to re-form the mask in a subsequent iteration of process 700.

Therefore, according to the above, some examples of the disclosure are directed to a method for suppressing structured noise (image artifacts). The method can comprise acquiring a touch image including touch signal measurements from a plurality of touch nodes of a touch-sensitive surface, generating a mask image to exclude touch signals meeting one or more criteria corresponding to a potential touch, applying the mask image to the touch image to generate a masked touch image, determining a respective noise characteristic for each of a plurality of respective groups of touch signals in the masked touch image, and removing the respective noise characteristic from each of the plurality of respective group of touch signals in the touch image. Additionally or alternatively to one or more of the examples disclosed above, in some examples, the one or more criteria can include a criterion that a touch signal greater than or equal to a threshold can be identified as corresponding to the potential touch. Additionally or alternatively to one or more of the examples disclosed above, in some examples, generating the mask image can include dilating touch signals meeting the one or more criteria corresponding to the potential touch. Additionally or alternatively to one or more of the examples disclosed above, in some examples, determining the respective noise characteristic for each of the plurality of respective groups of touch signals in the masked touch image and removing the respective noise characteristic from each of the plurality of respective group of touch signals in the touch image can comprise: determining the respective noise characteristic for each respective row in the masked touch image and removing the respective noise characteristic from each respective row in the touch image. Additionally or alternatively to one or more of the examples disclosed above, in some examples, determining the respective noise characteristic for each of the plurality of respective groups of touch signals in the masked touch image and removing the respective noise characteristic from each of the plurality of respective group of touch signals in the touch image can comprise: determining the respective noise characteristic for each respective column in the masked touch image and removing the respective noise characteristic from each respective column in the touch image. Additionally or alternatively to one or more of the examples disclosed above, in some examples, the method can further comprise repeating, for one or more iterations, the determining of the respective noise characteristic for each of the plurality of respective groups of touch signals in the masked touch image and removing the respective noise characteristic from each of the plurality of respective group of touch signals in the touch image. Additionally or alternatively to one or more of the examples disclosed above, in some examples, the repeating for one or more iterations can occur until one or more noise criteria are met. Additionally or alternatively to one or more of the examples disclosed above, in some examples, the repeating for one or more iteration can occur within a predefined window of time. Additionally or alternatively to one or more of the examples disclosed above, in some examples, the respective noise characteristic can a constant noise offset. Additionally or alternatively to one or more of the examples disclosed above, in some examples, the respective noise characteristic can be a linear function offset.

Some examples of the disclosure are directed to a non-transitory computer readable storage medium. A non-transitory computer readable storage medium can store instructions, which when executed by one or more processors, cause the one or more processors to perform any of the above methods. Some examples of the disclosure are directed to an electronic device. The electronic device can comprise a touch-sensitive surface and one or more processors capable of performing any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
a touch-sensitive surface; and
one or more processors coupled to the touch-sensitive surface configured to:
acquire a touch image including touch signal measurements from a plurality of touch nodes of the touch-sensitive surface;
remove baseline touch data from the touch image; and
remove noise from the touch image, wherein removing noise from the touch image comprises:
determining a first respective noise characteristic for each of a first plurality of respective groups of touch signals in the touch image excluding touch signals in the touch image meeting one or more criteria corresponding to a potential touch, wherein each group of the first plurality of respective groups of touch signals corresponds to two or more of the plurality of touch nodes; and
removing the first respective noise characteristic from each of the first plurality of respective groups of touch signals in the touch image.

2. The electronic device of claim 1, wherein removing noise from the touch image comprises:
determining a second respective noise characteristic for each of a second plurality of respective groups of touch signals in the touch image excluding touch signals in the touch image meeting one or more criteria corresponding to a potential touch, wherein the second plurality of respective groups of touch signals is different that the first plurality of respective groups of touch signals wherein each group of the second plurality of respective groups of touch signals corresponds to two or more of the plurality of touch nodes; and
removing the second respective noise characteristic from each of the second plurality of respective groups of touch signals in the touch image.

3. The electronic device of claim 2, wherein determining the second respective noise characteristic for each of the second plurality of respective groups of touch signals and removing the second respective noise characteristic from each of the second plurality of respective group of touch signals in the touch image comprises:
determining the second respective noise characteristic for each respective column in the touch image excluding the touch signals in the touch image meeting the one or more criteria and removing the second respective noise characteristic from each respective column in the touch image.

4. The electronic device of claim 1, wherein removing noise from the touch image comprises a plurality of iterations, wherein each of the plurality of iterations includes determining a respective noise characteristic for each of a plurality of respective groups of touch signals in the touch image excluding the touch signals in the touch image meeting the one or more criteria corresponding to the potential touch and removing the respective noise characteristic from each of the plurality of respective groups of touch signals in the touch image.

5. The electronic device of claim 4, wherein the plurality of iterations occurs until one or more noise criteria are met or until a predefined window of time concludes.

6. The electronic device of claim 1, wherein the one or more criteria can include a criterion that a touch signal greater than or equal to a threshold be identified as corresponding to the potential touch.

7. The electronic device of claim 1, wherein the touch image excluding the touch signals in the touch image meeting the one or more criteria further excludes one or more touch signals around the touch signals meeting the one or more criteria.

8. The electronic device of claim 1, wherein determining the first respective noise characteristic for each of the first plurality of respective groups of touch signals and removing the first respective noise characteristic from each of the plurality of respective group of touch signals in the touch image comprises:
   determining the first respective noise characteristic for each respective row in the touch image excluding the touch signals in the touch image meeting the one or more criteria and removing the first respective noise characteristic from each respective row in the touch image.

9. The electronic device of claim 1, wherein the first respective noise characteristic is a linear function offset.

10. A method comprising:
   acquiring a touch image including touch signal measurements from a plurality of touch nodes of a touch-sensitive surface;
   removing baseline touch data from the touch image; and
   removing noise from the touch image, wherein removing noise from the touch image comprises:
      determining a first respective noise characteristic for each of a first plurality of respective groups of touch signals in the touch image excluding touch signals in the touch image meeting one or more criteria corresponding to a potential touch, wherein each group of the first plurality of respective groups of touch signals corresponds to two or more of the plurality of touch nodes; and
      removing the first respective noise characteristic from each of the first plurality of respective groups of touch signals in the touch image.

11. The method of claim 10, wherein removing noise from the touch image comprises:
   determining a second respective noise characteristic for each of a second plurality of respective groups of touch signals in the touch image excluding touch signals in the touch image meeting one or more criteria corresponding to a potential touch, wherein the second plurality of respective groups of touch signals is different that the first plurality of respective groups of touch signals wherein each group of the second plurality of respective groups of touch signals corresponds to two or more of the plurality of touch nodes; and
   removing the second respective noise characteristic from each of the second plurality of respective groups of touch signals in the touch image.

12. The method of claim 11, wherein determining the second respective noise characteristic for each of the second plurality of respective groups of touch signals and removing the second respective noise characteristic from each of the second plurality of respective group of touch signals in the touch image comprises:
   determining the second respective noise characteristic for each respective column in the touch image excluding the touch signals in the touch image meeting the one or more criteria and removing the second respective noise characteristic from each respective column in the touch image.

13. The method of claim 10, wherein removing noise from the touch image comprises a plurality of iterations, wherein each of the plurality of iterations includes determining a respective noise characteristic for each of a plurality of respective groups of touch signals in the touch image excluding the touch signals in the touch image meeting the one or more criteria corresponding to the potential touch and removing the respective noise characteristic from each of the plurality of respective groups of touch signals in the touch image.

14. The method of claim 13, wherein the plurality of iterations occurs until one or more noise criteria are met or until a predefined window of time concludes.

15. The method of claim 10, wherein the one or more criteria can include a criterion that a touch signal greater than or equal to a threshold be identified as corresponding to the potential touch.

16. The method of claim 10, wherein the touch image excluding the touch signals in the touch image meeting the one or more criteria further excludes one or more touch signals around the touch signals meeting the one or more criteria.

17. The method of claim 10, wherein determining the first respective noise characteristic for each of the first plurality of respective groups of touch signals and removing the first respective noise characteristic from each of the plurality of respective group of touch signals in the touch image comprises:
   determining the first respective noise characteristic for each respective row in the touch image excluding the touch signals in the touch image meeting the one or more criteria and removing the first respective noise characteristic from each respective row in the touch image.

18. The method of claim 10, wherein the first respective noise characteristic is a linear function offset.

19. A non-transitory computer readable storage medium storing instructions, which when executed by one or more processors, cause the one or more processors to:
   acquire a touch image including touch signal measurements from a plurality of touch nodes of a touch-sensitive surface;
   remove baseline touch data from the touch image; and
   remove noise from the touch image, wherein removing noise from the touch image comprises:
      determining a first respective noise characteristic for each of a first plurality of respective groups of touch signals in the touch image excluding touch signals in the touch image meeting one or more criteria corresponding to a potential touch, wherein each group of the first plurality of respective groups of touch signals corresponds to two or more of the plurality of touch nodes; and removing the first respective noise characteristic from each of the first plurality of respective groups of touch signals in the touch image.

20. The non-transitory computer readable storage medium of claim 19, wherein removing noise from the touch image comprises:

determining a second respective noise characteristic for each of a second plurality of respective groups of touch signals in the touch image excluding touch signals in the touch image meeting one or more criteria corresponding to a potential touch, wherein the second plurality of respective groups of touch signals is different that the first plurality of respective groups of touch signals wherein each group of the second plurality of respective groups of touch signals corresponds to two or more of the plurality of touch nodes; and removing the second respective noise characteristic from each of the second plurality of respective groups of touch signals in the touch image.

\* \* \* \* \*